United States Patent [19]

Iizuka

[11] 4,398,807

[45] Aug. 16, 1983

[54] ZOOM LENS

[75] Inventor: Yutaka Iizuka, Tokyo, Japan

[73] Assignee: Nippon Kogaku K. K., Tokyo, Japan

[21] Appl. No.: 235,086

[22] Filed: Feb. 17, 1981

[30] Foreign Application Priority Data

Feb. 26, 1980 [JP] Japan .................................. 55-22995

[51] Int. Cl.³ .............................................. G02B 15/16
[52] U.S. Cl. ..................................................... 350/427
[58] Field of Search ................................. 350/427, 423

[56] References Cited

U.S. PATENT DOCUMENTS 3,615,125  10/1971  Higuchi et al. ..................... 350/427
4,025,167  5/1977   Ikeda .................................. 350/427
4,223,981  9/1980   Mizutani et al. ................... 350/427

Primary Examiner—John K. Corbin
Assistant Examiner—Scott J. Sugarman
Attorney, Agent, or Firm—Shapiro and Shaprio

[57] ABSTRACT

An improvement in zoom lenses of the type consisting of four lens groups of positive, negative, positive, power positive and arranged in this order as viewed from the object side is disclosed. The improved zoom lenses exhibit excellent high focusing ability even for close distance photographing with higher magnification.

2 Claims, 7 Drawing Figures

ZOOM LENS

BACKGROUND OF THE INVENTION

1. Field of the Invention

The present invention relates to zoom lenses of the type consisting of four lens groups of positive, negative, positive, and positive power arranged in this order as viewed from the object side and is directed to improvements in this type of zoom lenses.

2. Description of the Prior Art

Examples of the above mentioned type of zoom lenses are disclosed, for example, in Japanese Patent Publication No. 31,818/1970 the counterpart of which is U.S. Pat. No. 3,615,125 and Japanese Pat. Laid open No. 131,852/1978. In these known zoom lenses, focusing is generally achieved by moving the most object side positive lens group. However, their focusing ability for close distance photographing is not satisfactory.

SUMMARY OF THE INVENTION

Accordingly, it is an object of the invention to improve the focusing ability of such zoom lenses.

It is another object of the invention to shorten the focusing distance for a close distance object by employing the first group as a shifting system.

It is still a more specific object to provide the above mentioned type of zoom lenses which are excellent in focusing ability and which enable photography with a higher magnification while maintaining the high focusing ability.

Other and further objects, features and advantages of the invention will appear more fully from the following description.

DESCRIPTION OF PREFERRED EMBODIMENTS

Figure 1:
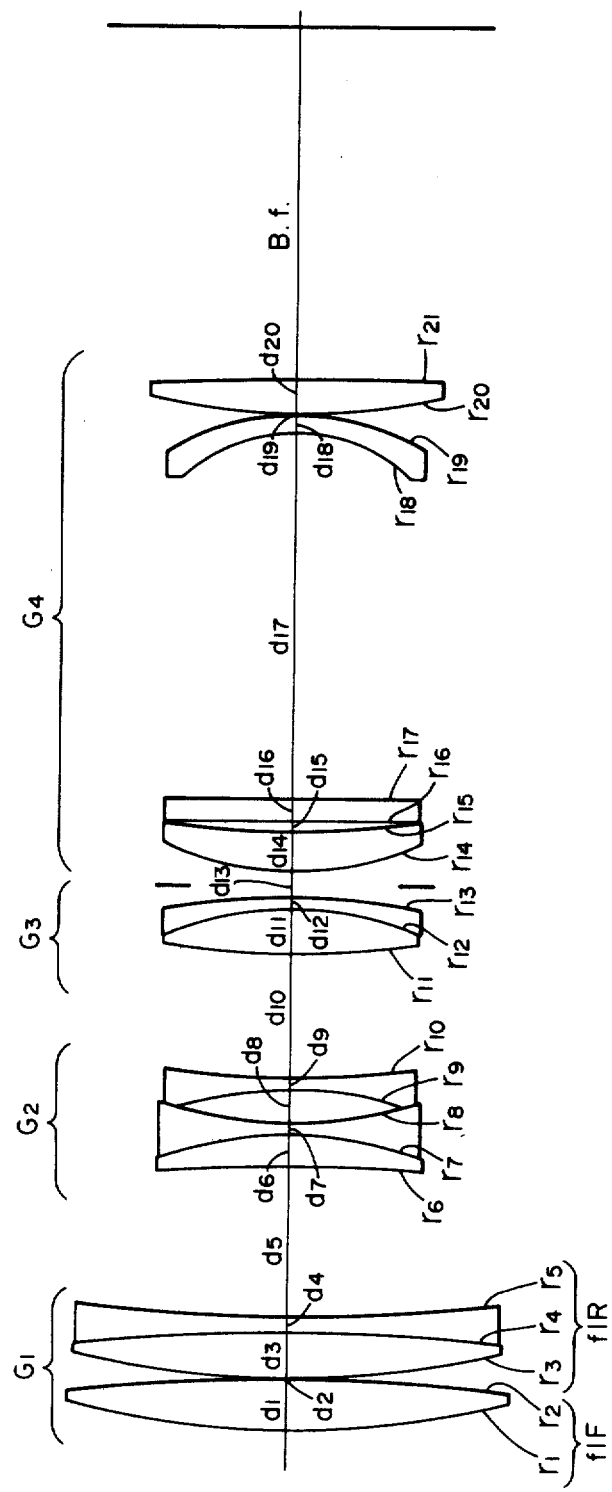
FIG. 1 is a cross-sectional view of a zoom lens showing an embodiment of the invention.

As shown in FIG. 1, a zoom lens according to the invention consists of a first positive lens group G1, a second negative lens group G2, a third positive lens group G3 and a fourth positive lens group G4 arranged in this order as viewed from the object side. The first lens group G1 can be driven to shift toward the object side over the whole focal length range and is used for focusing only. The second lens group G2 can be moved along the optical axis in linear fashion and functions as a variator for changing the magnification. The third lens group G3 functions as a compensator for maintaining at a predetermined position the image plane which is variable with the movement of the second lens group G2. The fourth lens group G4 remains fixed relative to magnification change and focusing. It functions as a relay lens relative to the variation system constituted by the first, second and third lens groups. The first lens group is composed of a front component that is a single positive lens and a rear component constituted by a positive lens and a negative lens cemented together. The resulting power of the doublet lens is positive and the cemented surface is convex toward the image side. In accordance with the present invention, the zoom lens is so designed as to satisfy the following conditions (1) to (6):

$$1.3 < \frac{fT}{f1} < 1.6 \qquad (1)$$

$$1.2 < \frac{f4}{fW} < 1.4 \qquad (2)$$

$$1.26 < \frac{f1F}{f1} < 1.4 \qquad (3)$$

$$4.0 < \frac{f1R}{f1} < 5.0 \qquad (4)$$

$$0.3 < \frac{r2 + r1}{r2 - r1} < 0.5 \qquad (5)$$

$$2.5 < \frac{r5 + r3}{r5 - r3} < 3.0 \qquad (6)$$

wherein, f1, f2, f3 and f4 are the focal lengths of the first, second, third and fourth lens groups respectively;

fW is the shortest focal length of the total system offered by zooming;

fT is the longest focal length thereof;

f1F is the focal length of the front component of the first lens group;

f1R is the focal length of the rear component of the first lens group;

r1 and r2 are radii of curvature of the first and second surfaces of the front component;

r3 and r5 are radii of curvature of the surfaces at the object side and at the image side of the cemented rear component.

The conditions (1) and (2) determine the basic structure of the present invention. The condition (1) relates to the focal length of the first lens group G1 and the second condition (2) relates to the focal length of the fourth lens group G4.

In general, for a zoom lens composed of a variation part and a relay lens part, the relative size of the variation part to the relay lens part is determined by the focal length of the first lens group. The value of fT/f1 relates also to the magnification of the total of the second and following groups which act on the image point of the first group for the longest focal length.

If the value of fT/f1 exceeds the lower limit given by the condition (1), the size of the variation system becomes large which militates against the general desire for miniaturization. In addition, since the amount of shift toward the shortest object distance becomes large, the quantity of light of the marginal rays is reduced.

On the contrary, if the value exceeds the upper limit, then Petzval sum becomes negative because the then respective focal lengths of the lens groups in the variation system become short. Therefore, in this case it is difficult to correct field curvature. Variation of aberrations by zooming as well as by focusing becomes too large to correct.

The focal length of the fourth lens group which functions as a relay lens defines the range of variable magnification for the variation part composed of the first, second and third lens groups. When the variation part is afocal, the value of f4/fW means the reciprocal of angular magnification of the variation part for the shortest focal length.

If the value f4/fW exceeds the upper limit of the condition (2), then not only the size of the relay lens but also the diaphragm aperture become enlarged which also militates against the desire for miniaturization. On the contrary, when the value is smaller than the lower limit of the condition (2), it is difficult to compensate the insufficient correction of spherical aberration. Also, since the Petzval sum becomes negative, it is difficult to obtain the desired flatness of image plane.

Conditions (3) to (6) determine the concrete structure of the first lens group G1 whose function is to focus. These conditions are of importance particularly for attaining the object of the invention to improve the focusing ability at close object distances. Of these conditions, condition (3) determines the front component's share of the focal length in the first lens group.

For shortening the object distance for extreme close distance photographing by shifting the first lens group, the share of the focal length should be determined taking into consideration not only the variation of spherical aberration but also that of field curvature.

A value greater than the upper limit of the condition (3) will result in too long a focal length of the front component of the first lens group. This increases the charge on the rear component too much. The rear component which is a cemented lens has to correct the variations of spherical aberration and field curvature in addition to correcting of chromatic aberrations. Clearly, in this case, the freedom of correction available is too small. On the contrary, a value smaller than the lower limit of the condition (3) will result in too short a focal length of the front component. In this case, it is practically impossible to compensate for the insufficient correction of spherical aberration even through the bending of the front component itself is taken into consideration.

Condition (4) determines the rear component's share of the focal length in the first lens group. Since the rear component is a cemented doublet, the focal length of the rear component is longer than that of the front component which is a single lens.

If the value is greater than the upper limit of the condition (4), then the focal length of the rear component becomes too long to effectively refract the beam of light coming from the front component. Since the front component has to take an excessively large share of refractive power, the spherical aberration becomes extremely large in the negative direction.

On the contrary, if the value is smaller than the lower limit of the condition (4), the rear component has to take an excessively large share of power although the component is a cemented doublet. The focal length of the front positive lens in the rear component becomes unduly short and therefore it is difficult to correct the variation of aberrations in particular for close distances.

Condition (5) determines the configuration of the front component of the first lens group. To improve the ability for close distance photographing, not only the distribution of focal length to the components of the first lens group but also the bending configuration of the components must be determined most properly.

If the value exceeds the upper limit of the condition (5), then field curvature for close object distances at the side of long focal length becomes excessively large in the positive direction and there is produced coma causing a degradation of the lens performance.

On the contrary, if the value is smaller than the lower limit of the condition (5), then field curvature becomes excessively large in the negative direction.

Condition (6) determines the configuration of the rear component of the first lens group. If the value exceeds the upper limit of the condition (6), then both spherical aberration and field curvature on the long focal length side become unduly large in the positive direction causing the generation of coma and, therefore, the performance of the lens system is degraded. Furthermore, on the long focal length side, focusing is accompanied by a larger variation of spherical aberration and field curvature. Nearer to the short focal length side, these aberrations become more excessive in the positive direction.

If the value is smaller than the lower limit of the condition (6), then both the spherical aberration and field curvature become unduly large in the negative direction, in particular on the side of long focal length.

For the arrangement of a zoom lens according to the invention described above, it is preferred that the cemented surface r4 of the rear component of the first lens group G1 should have a refractive power $$\frac{n3 - n2}{r4}$$

(wherein n2 and n3 are refractive indexes of the positive and negative lenses cemented together) lying within the range given below:

$$-\frac{1}{1200} < \frac{n3 - n2}{r4} < -\frac{1}{1400} \quad (7)$$

The cemented lens is used to correct chromatic aberrations and also to produce intentionally positive spherical aberration by the negative power of the cemented surface at the same time. When the cemented lens is designed to satisfy the above condition, it is easy to control the spherical aberrations of the first lens group which plays an important role in zooming as well as in focusing. Also, this makes it easy to correct the aberration in a well-balanced manner with the total system. Furthermore, by using a low refractive glass for the positive lens there is produced such Petzval sum which can contribute to a well-balanced Petzval sum over the total system.

If the refractive power exceeds the upper limit of the condition (7), then there may be produced an excess amount of positive spherical aberration. On the contrary, when the value is smaller than the lower limit of the condition (7), Petzval sum becomes excessively large and also the selection range of glass suitable for correction of chromatic aberrations is narrowed, which makes the correction of aberrations difficult.

The following table shows data of a preferred embodiment of the invention:

focal length f=75.024~106.106~150.086 F number 3.5

|   | r | d | nd | vd |
|---|---|---|---|---|
| 1 | 120.600 | 5.1000 | 1.62041 | 60.3 |
| 2 | −262.500 | 0.2000 | | |
| 3 | 98.380 | 5.7000 | 1.62041 | 60.3 |
| 4 | −173.840 | 1.6000 | 1.75520 | 27.5 |
| 5 | 215.500 | d5 = variable | | |
| 6 | −163.222 | 3.7000 | 1.78470 | 26.1 |
| 7 | −40.083 | 1.2000 | 1.51680 | 64.2 |
| 8 | 54.000 | 3.8000 | | |
| 9 | −42.000 | 1.2000 | 1.62041 | 60.3 |
| 10 | 124.706 | d10 = variable | | |
| 11 | 135.900 | 5.3000 | 1.62041 | 60.3 |
| 12 | −30.776 | 1.1000 | 1.75520 | 27.5 |
| 13 | −66.990 | d13 = variable | | |
| 14 | 33.750 | 4.7000 | 1.62041 | 60.3 |
| 15 | 133.032 | 1.0000 | | |
| 16 | −462.320 | 2.1000 | 1.75520 | 27.5 |
| 17 | 637.000 | 42.0 | | |
| 18 | −19.704 | 2.0000 | 1.74950 | 34.96 |
| 19 | −28.653 | 0.3000 | | |
| 20 | 77.683 | 3.9000 | 1.62588 | 35.6 |
| 21 | −419.799 | | | | f1 = 103.016    f1F = 133.877
f2 = −35.355    f1R = 467.476
f3 = 88.074     B.f = 40.165
f4 = 95.281

| f | 75.024 | 106.106 | 150.086 |
|---|---|---|---|
| d5 | 1.850 | 17.227 | 28.101 |
| d10 | 24.364 | 14.502 | 0.555 |
| d13 | 8.146 | 2.631 | 5.706 |

In the table, r is radius of curvature of each lens surface, d is the lens thickness or the spacing between lenses at the optical axis, nd is refractive index of each lens and vd is the Abbe number. The number given in the left-most column indicates the order of the lens surfaces as viewed from the object field side.

Figure 2A:
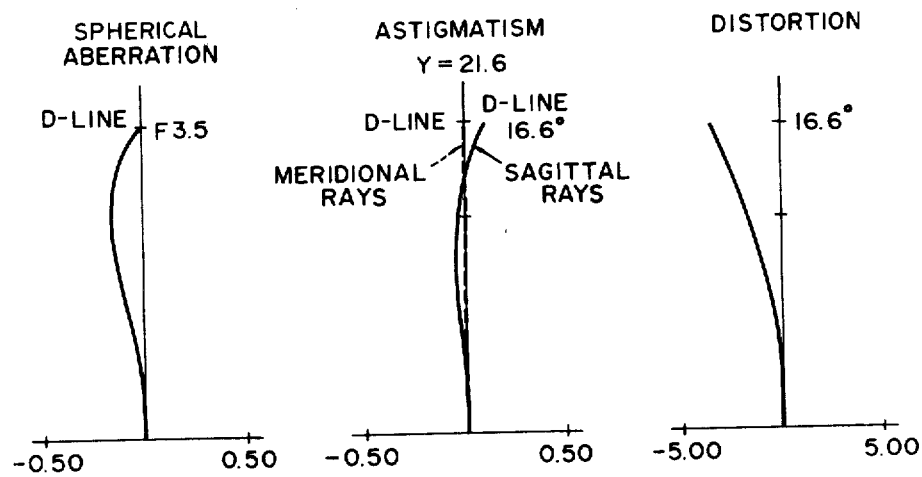
FIG. 2A shows various aberrations for infinity when the embodiment is in the position of its shortest focal length.
Figure 2A:
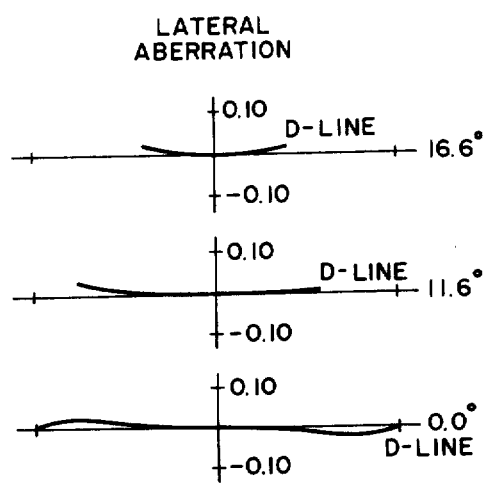
Figure 2B:
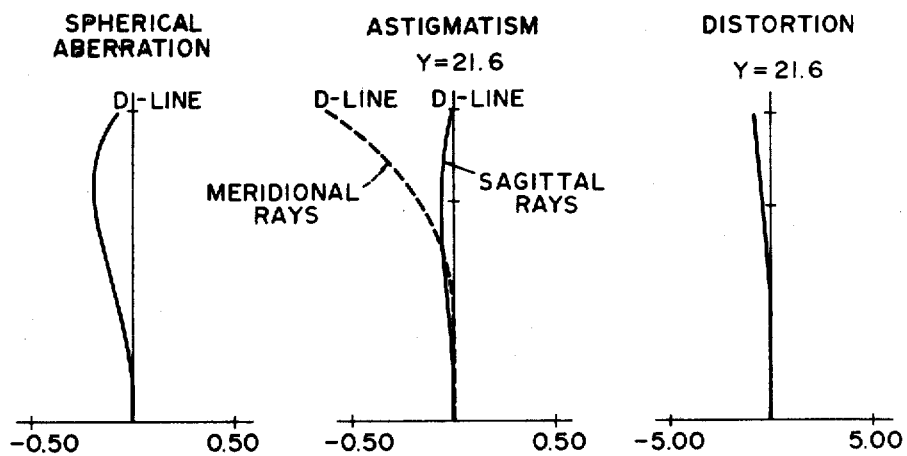
FIG. 2B shows various aberrations for close distance when the embodiment is in the position of its shortest focal length.
Figure 2B:
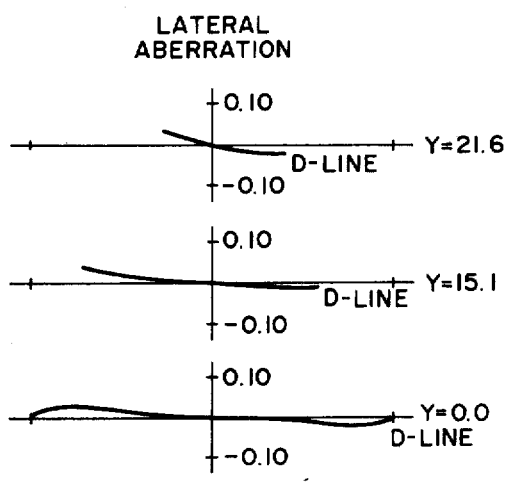
Figure 3A:
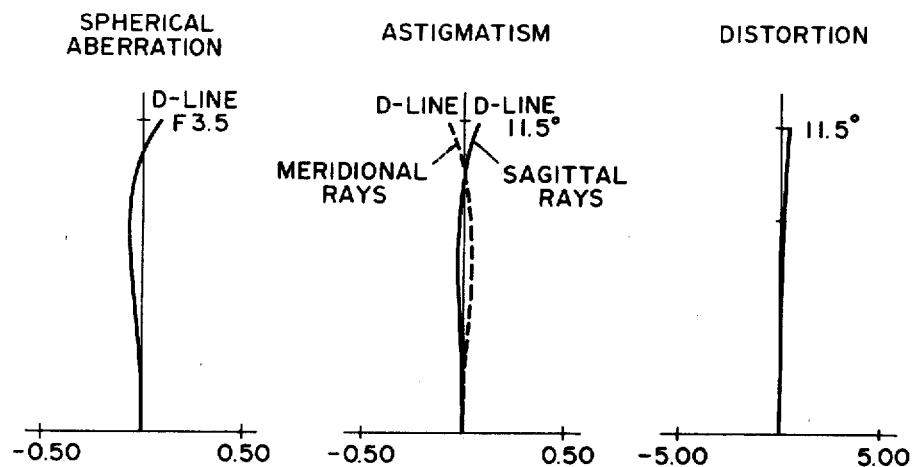
FIG. 3A shows various aberrations for infinity when the embodiment is in the position of its mid-focal length.
Figure 3A:
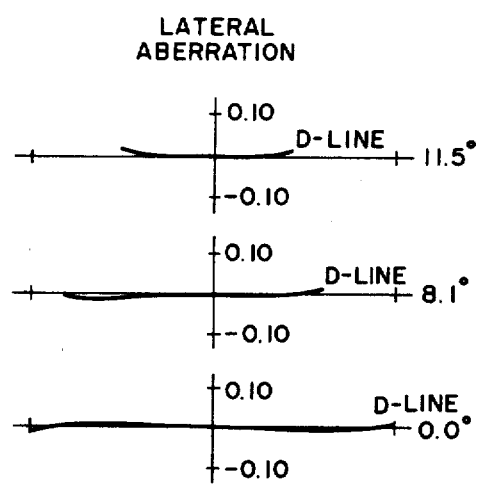
Figure 3B:
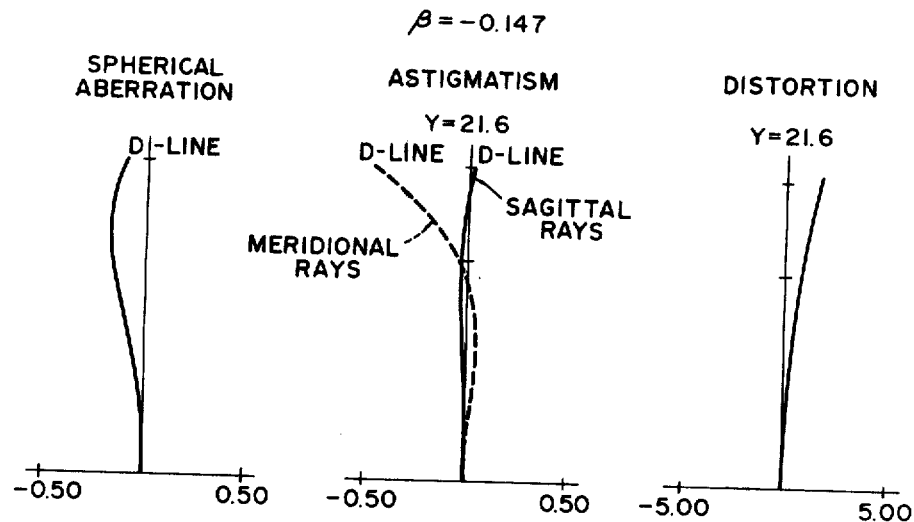
FIG. 3B shows various aberrations for close distance when the embodiment is in the position of its mid-focal length.
Figure 3B:
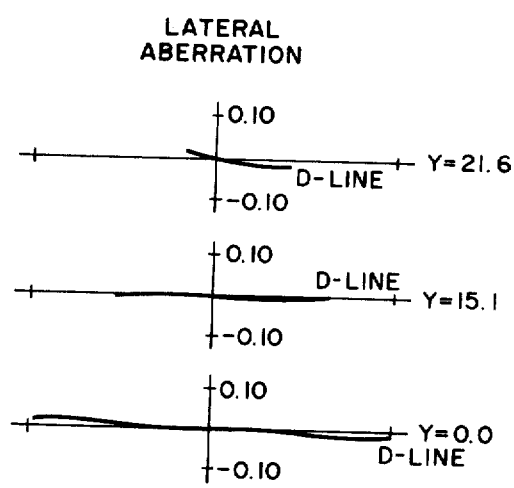
Figure 4A:
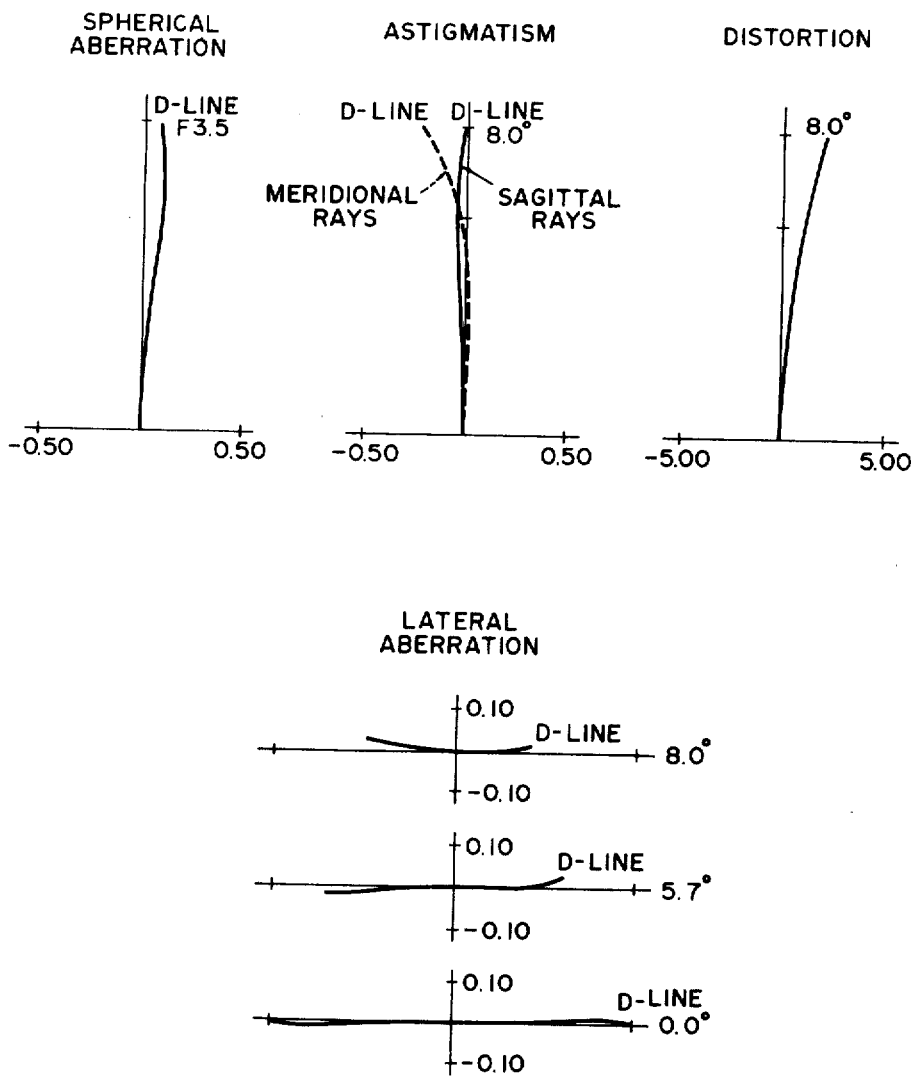
FIG. 4A shows various aberrations for infinity when the embodiment is in the position of its longest focal length.
Figure 4B:
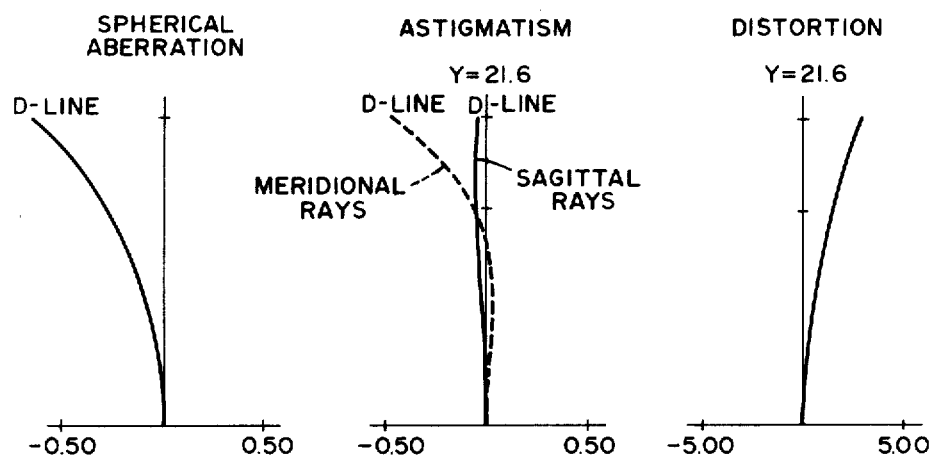
FIG. 4B shows various aberrations for close distance when the embodiment is in the position of its longest focal length.
Figure 4B:
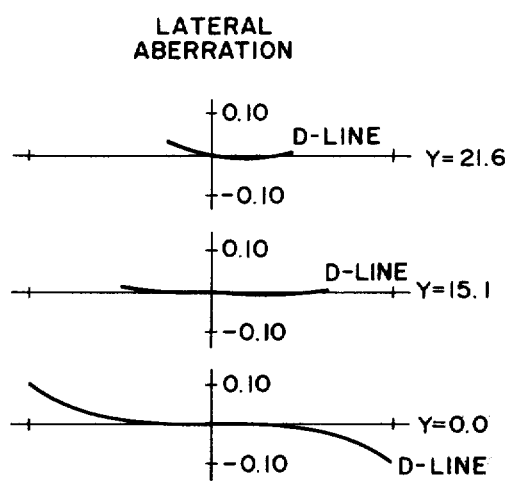

The shown embodiment is for use in a 35 mm still camera. The zoom lens covers the mid-telescopic range of 75 to 150 mm in focal length. Its zoom ratio is 2.0 and F number is 3.5. By shifting the first lens group, the minimum object distance was reduced to 1 m and the magnification for photographing with the longest focal length reached 1/5. Various aberrations for infinity in the embodiment are graphically shown in FIG. 2A for the shortest focal length position, FIG. 3A for the mid-focal length position and FIG. 4A for the longest focal length position. Also, various aberrations for a close object distance are similarly shown in FIGS. 2B, 3B and 4B.

From the aberration curves it is clearly seen that in accordance with the invention a zoom lens has been obtained which is excellent in focusing ability even for close object distances while affording a relatively large aperture ratio.

While the invention has been particularly shown and described with reference to preferred embodiments thereof, it will be understood by those skilled in the art that the foregoing and other changes in form and details can be made therein without departing from the spirit and scope of the invention.

I claim:

1. In a zoom lens consisting of a first positive lens group, a second negative lens group, a third positive lens group and a fourth positive lens group arranged in this order as viewed from the object field side, wherein the first lens group functions as a focusing unit, the second lens group functions as a variator for changing the magnification by moving along the optical axis in a linear fashion, the third lens group functions as a compensator for maintaining at a predetermined position the image plane which is variable with the movement of said second lens group, and the fourth lens group functions as a relay lens, and wherein said first lens group is composed of a front component constitututed by a positive lens and a rear component constituted by a positive lens and a negative lens cemented together with the resulting power being positive and the cemented surface being concave toward the object side, the improvement being characterized in that said zoom lens satisfies the following conditions:

$$1.3 < \frac{fT}{f1} < 1.6 \quad (1)$$

$$1.2 < \frac{f4}{fW} < 1.4 \quad (2)$$

$$1.26 < \frac{f1F}{f1} < 1.4 \quad (3)$$

$$4.0 < \frac{f1R}{f1} < 5.0 \quad (4)$$

$$0.3 < \frac{r2 + r1}{r2 - r1} < 0.5 \quad (5)$$

$$2.5 < \frac{r5 + r3}{r5 - r3} < 3.0 \quad (6)$$

$$-\frac{1}{1200} < \frac{n3 - n2}{r4} < -\frac{1}{1400} \quad (7)$$

wherein, f1, f2, f3 and f4 are the focal lengths of said first, second, third and fourth lens groups, respectively;
fW is the shortest focal length of the total system offered by zooming;
fT is the longest focal length thereof;
f1F is the focal length of the front component of said first lens group;
f1R is the focal length of the rear component thereof;
r1 and r2 are radii of curvature of the first and second surfaces of said front component, respectively, r4 is the radius of curvature of the cemented surface of said rear component of the first lens group, and r3 and r5 are radii of curvature of the surfaces at the object side and at the image side of said rear component, respectively; and n2 is the refractive index of the positive lens constituting said rear component of the first lens group and n3 is the refractive index of the negative lens constituting said rear component of the first lens group.

2. A zoom lens as set forth in claim 1 which is characterized by the following data:
focal length f=75.024∼106.106∼150.086 F number 3.5

|   | r | d | nd | vd |
|---|---|---|---|---|
| 1 | 120.600 | 5.1000 | 1.62041 | 60.3 |
| 2 | −262.500 | 0.2000 | | |
| 3 | 98.380 | 5.7000 | 1.62041 | 60.3 |
| 4 | −173.840 | 1.6000 | 1.75520 | 27.5 |
| 5 | 215.500 | d5 = variable | | |
| 6 | −163.222 | 3.7000 | 1.78470 | 26.1 |
| 7 | −40.083 | 1.2000 | 1.51680 | 64.2 |
| 8 | 54.000 | 3.8000 | | |
| 9 | −42.000 | 1.2000 | 1.62041 | 60.3 |
| 10 | 124.706 | d10 = variable | | |
| 11 | 135.900 | 5.3000 | 1.62041 | 60.3 |
| 12 | −30.776 | 1.1000 | 1.75520 | 27.5 |
| 13 | −66.990 | d13 = variable | | |
| 14 | 33.750 | 4.7000 | 1.62041 | 60.3 |
| 15 | 133.032 | 1.0000 | | |
| 16 | −462.320 | 2.1000 | 1.75520 | 27.5 |

-continued

| | | | | |
|---|---|---|---|---|
| 17 | 637.000 | 42.0 | | |
| 18 | −19.704 | 2.0000 | 1.74950 | 34.96 |
| 19 | −28.653 | 0.3000 | | |
| 20 | 77.683 | 3.9000 | 1.62588 | 35.6 |
| 21 | −419.799 | | | |

| | | | |
|---|---|---|---|
| f1 = 103.016 | | f1F = 133.877 | |
| f2 = −35.355 | | f1R = 467.476 | |
| f3 = 88.074 | | B.f = 40.165 | |
| f4 = 95.281 | | | |

| | | | |
|---|---|---|---|
| f | 75.024 | 106.106 | 150.086 |
| d5 | 1.850 | 17.227 | 28.101 |

-continued

| | | | |
|---|---|---|---|
| d10 | 24.364 | 14.502 | 0.555 |
| d13 | 8.146 | 2.631 | 5.706 | wherein,
r is radius of curvature of lens surface;
d is lens thickness or space at center;
nd is refractive index of lens;
νd is Abbe number of lens; and
the number given in the left-most column indicates the order of lens surfaces as viewed from the object field side.

* * * * *